C. W. MICHAEL.
DISK PLOW.
APPLICATION FILED JUNE 17, 1916.
1,395,050.
Patented Oct. 25, 1921.
4 SHEETS—SHEET 2.
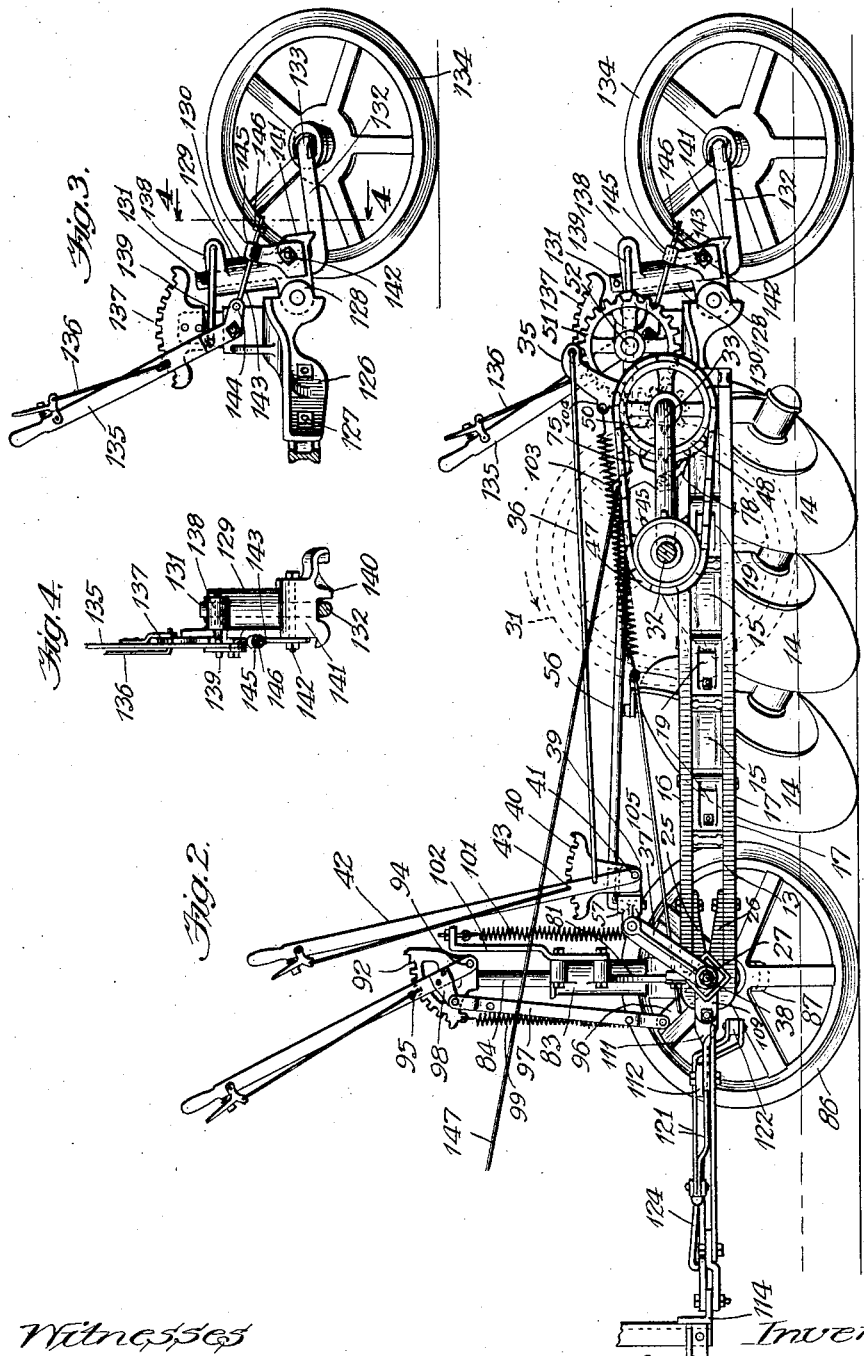

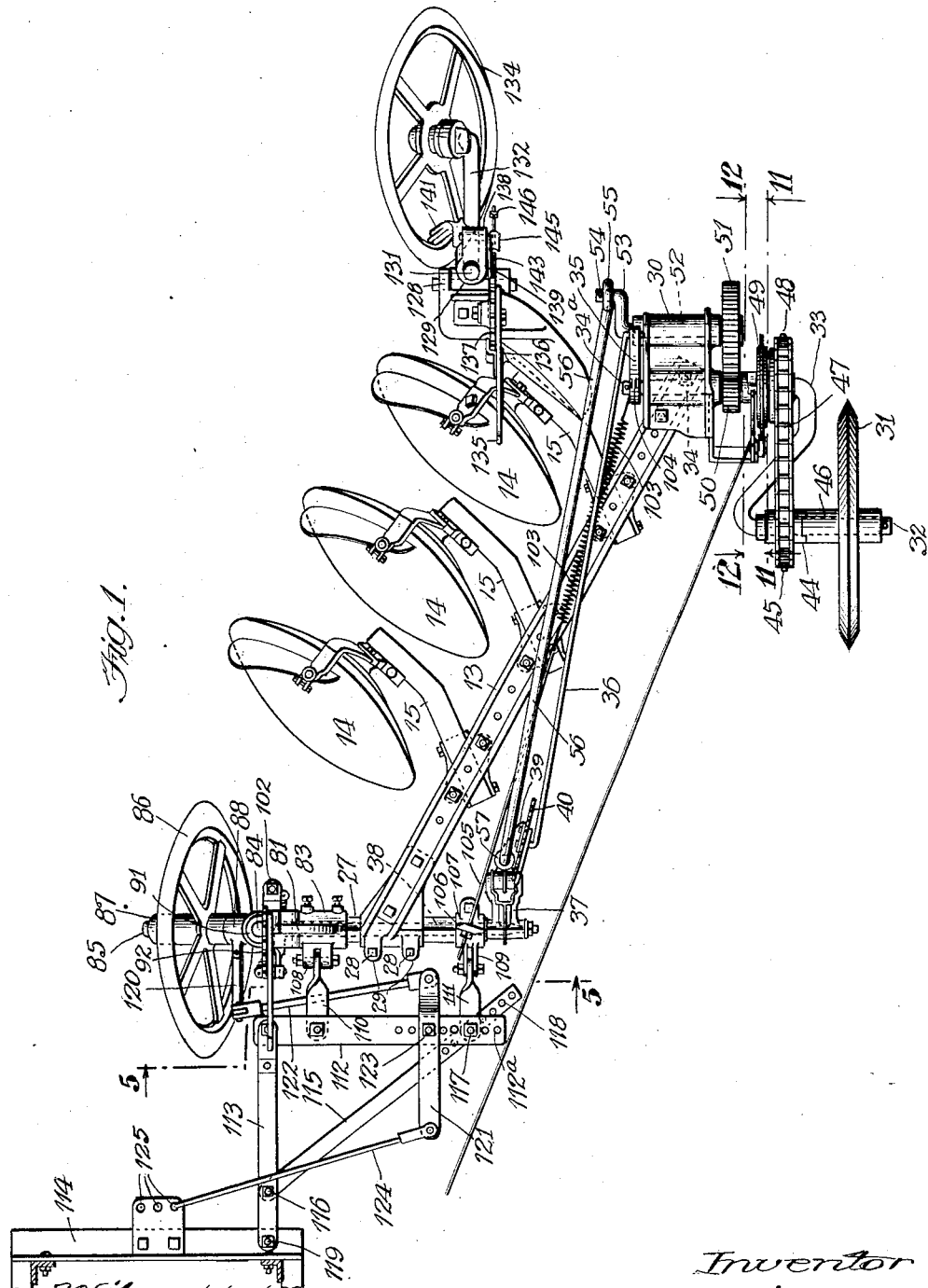

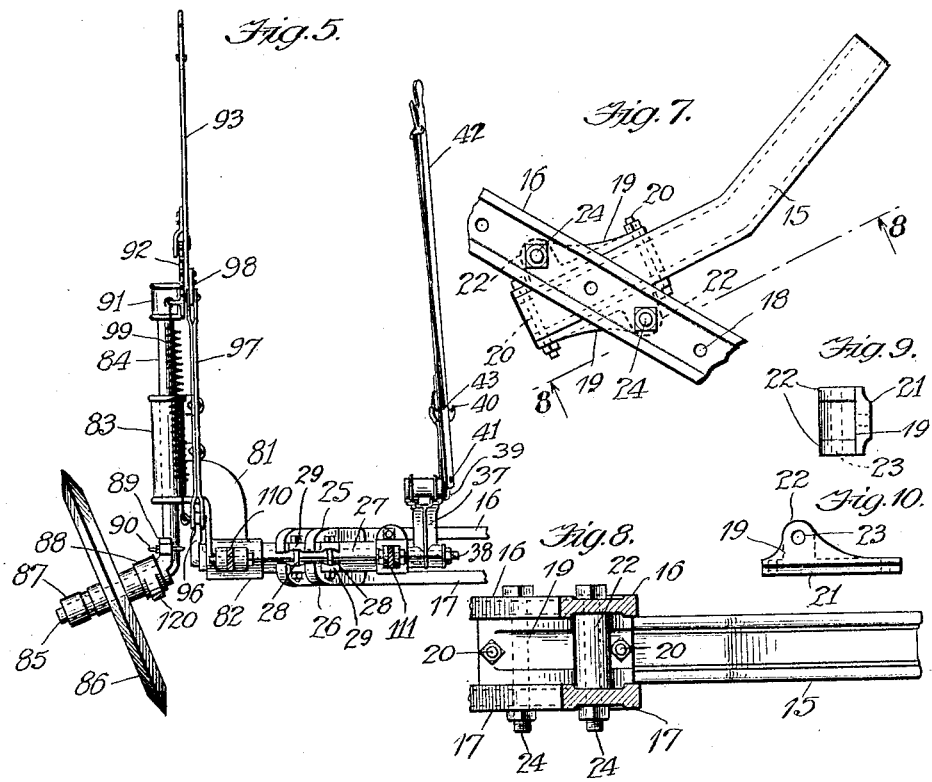
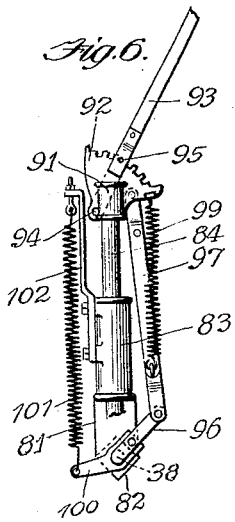

C. W. MICHAEL.
DISK PLOW.
APPLICATION FILED JUNE 17, 1916.
1,395,050.
Patented Oct. 25, 1921.
4 SHEETS—SHEET 4.
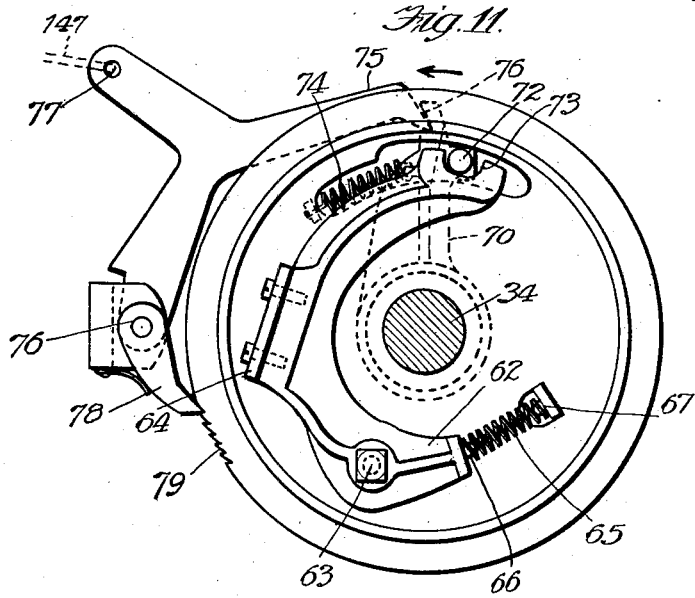
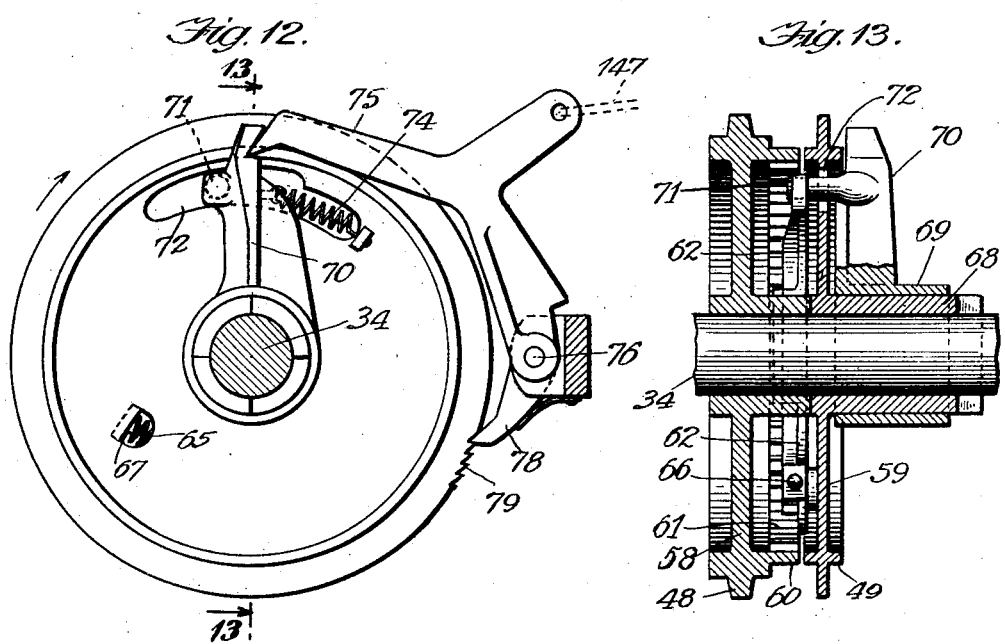

UNITED STATES PATENT OFFICE.

CLEMENT W. MICHAEL, OF RACINE, WISCONSIN, ASSIGNOR TO J. I. CASE PLOW WORKS, OF RACINE, WISCONSIN, A CORPORATION OF WISCONSIN.

DISK PLOW.

1,395,050.     Specification of Letters Patent.     Patented Oct. 25, 1921.

Application filed June 17, 1916. Serial No. 104,198.

*To all whom it may concern:*

Be it known that I, CLEMENT W. MICHAEL, a citizen of the United States, residing at Racine, in the county of Racine and State of Wisconsin, have invented certain new and useful Improvements in Disk Plows, of which the following is a specification.

The invention relates more particularly to disk plows designed to be drawn by mechanical tractors, the purpose being to provide a plow which can be conveniently operated by the tractor operator without outside assistance.

In the accompanying drawings I have shown in detail, and in the following specification described, a preferred embodiment of my invention; it will be understood, however, that the specific disclosure is for the purpose of exemplification only, and that the scope of the invention is defined in the following claims in which I have endeavored to distinguish it from the prior art so far as known to me without, however, relinquishing or abandoning any portion or feature thereof.

In the drawings Figure 1 is a plan view of the preferred embodiment of my invention; Fig. 2 a side elevation thereof; Fig. 3 a detail elevation, parts being removed for the sake of clearness; Fig. 4 a vertical transverse section on the line 4—4 of Fig. 3; Fig. 5 a transverse vertical section of the detail on the line 5—5 of Fig. 1; Fig. 6 a detail in elevation with parts removed as seen from the left in Fig. 5; Fig. 7 an enlarged plan of a detail; Fig. 8 a section on the line 8—8 of Fig. 7 looking in the direction of the arrows; Figs. 9 and 10 views perpendicular to each other of a detail; Fig. 11 a sectional detail on the line 11—11 of Fig. 1 looking in the direction of the arrows; Fig. 12 a sectional detail on the line 12—12 of Fig. 1 looking in the direction of the arrows, and Fig. 13 a central, vertical cross-section on the line 13—13 of Fig. 12 looking in the direction of the arrows and parts being shown in elevation. Each part is identified by the same reference character wherever it occurs in the several views.

The main beam 13 of the plow is so connected to the wheels that when the plow is in operation it extends at an inclination to the direction of movement of the plow, so that the disks 14, which are connected thereto by disk beams 15, are arranged at a similar incline, or in echelon. The main beam 13 is composed of an upper member 16 and a lower member 17, spaced apart and including between them the forward ends of the disk beams 15. As shown in Figs. 7 and 8 the members of the main beam are formed with shallow grooves in their upper and lower faces, and provided, as at 18, with registering perforations for insertion of the bolts by which the disk beams are connected to said main beam, as will be hereinafter set forth. The bolt holes being equally spaced the disk beams may be adjusted to any desired distance from each other. The disk beams are I-shaped in cross-section to provide broad bearing flanges for engaging the members of the main beam, and connecting brackets 19 are bolted on opposite sides of the forward ends of said disk beams by bolts 20; brackets 19 are formed upon the faces which abut the disk beams with broad longitudinally extending ribs 21, which extend into the adjacent channels in said beams, and thereby lock the latter from relative movement in a vertical direction, and are provided near one end with outwardly extending ears 22 which are perforated at 23 to receive the bolts by which the brackets are secured to the main beam, said bolts passing through the bolt holes in said main beam heretofore described. The upper and lower members 16, 17, of the main beam are spaced apart to snugly fit upon opposite sides of the disk beams and of the brackets which are of the same vertical dimension, and in assembling these elements together a pair of brackets is first secured to the disk beam, the members of the pair being reversely arranged, as shown in Fig. 7, so that the line between the holes in the ears is at an angle to the disk beam, the brackets are bolted in this position, and then the disk beam being arranged with relation to the main beam, as shown, is bolted thereto by bolts 24 inserted through the registering openings in the main beam and disk beam respectively. By means of the construction just described the disk beam is rigidly but removably and adjustably secured to the main beam. Each main beam member at its forward end is bolted to castings 25, 26, which castings at their forward ends are formed with angular transverse recesses or grooves, and together receive between them the squared sleeve 27, which is clamped between said castings by means of bolts 28 inserted in ears 29 on said castings extending forwardly of said sleeve. At their rear ends said members are secured to a casting 30, which is supported from the land-wheel 31 in a manner to be presently described.

In addition to the land-wheel the plow frame is provided with a forward and a rear furrow wheel, each of the wheels being separately adjustable as to height relative to the plow body, and the land-wheel and front furrow wheel being movable together by means to be hereinafter described to raise and lower the frame carrying the ground working means to carry the latter into and out of operative position.

The land-wheel is loosely mounted on a spindle 32 which forms part of an S-shaped bar 33, which at its other end is journaled at 34 in the casting 30. The purpose of this manner of mounting the land wheel is to enable it to be raised, lowered and adjusted with reference to the casting 30 in order to raise and lower the disks 14 at will, and to adjust their depth with relation to the ground to be plowed. The inner end 34ª of said rod has keyed or otherwise secured thereto an arm 35 to which is connected certain mechanism for oscillating the S-shaped bar 33 in the casting 30 to raise and lower the land-wheel with reference to said casting. Said mechanism includes a tension rod 36 which is indirectly connected to an arm 37, which is rigidly mounted upon a rock shaft 38 extending through and mounted in squared sleeve 27 referred to above. Thus the rocking of the shaft 38 in the proper direction through the arm 37 and link or tension rod 36 swings the arm 35 upon the S-shaped rod 33 and rocks the latter in its bearing in the casting 30 to raise and lower the land-wheel 31. Link rod 36 is not directly connected to the arm 37, but the latter has pivoted at the outer end thereof a casting 39 carrying an arcuate rack 40 to which is pivoted at 41 a handle 42, having a locking pawl 43, and link 36 is pivoted to said handle so that by adjusting the latter the effective length of the connection between the arms 35 and 37 is adjusted. It will thus be understood that by adjusting the handle 42 the angular position of the journal 32 of the land-wheel and therefore its height relative to the casting 30 may be varied without changing the position of the arm 37.

The power for rocking arm 37 for raising and lowering the land-wheel is taken from the land-wheel itself. For this purpose the hub 44 of a sprocket wheel 45 is locked to the hub 46 of the land-wheel so as to always turn therewith, and a sprocket chain 47 connects said sprocket wheel with a somewhat larger sprocket 48 mounted upon the other limb 34 of the rod 33, but normally the sprocket 48 is loose or idle upon its bearing so that it readily turns with sprocket 45 and land-wheel 31 without performing any function. A clutch 49 (see Fig. 1) on the limb or axle 34 of the member 33 is adapted to connect the sprocket 48 to a pinion 50 also loose upon axle 34, the construction of the clutch being such that when thrown into engagement it effects a complete revolution of pinion 50 and then again disconnects it from the sprocket 48. Pinion 50 drives a gear 51 of twice the diameter of said pinion so that for each revolution of pinion 50 there is a half revolution of gear 51. Gear 51 is secured to a stub shaft 52 which is journaled in the casting 30 and carries at its opposite end an arm 53, and a wrist pin 54 on said arm is connected by a thrust rod 56 with the arm 37 heretofore mentioned, the oscillation of which through link 36 and arm 35 swings the land-wheel 31 from its raised to its lowered position and vice versa. The downwardly turned end of said thrust rod 56 is received in a socket 57 in the casting 39 which, as before described, is pivoted to the arm 37. The arm 53 by which the thrust rod 56 is actuated is so related to the clutch that when the clutch is opened the arm is left in substantially horizontal position in either its forward or rearward position as the case may be. Thus when the land-wheel is in its lowered position the arms 35 and 37, as well as the arm 53, are in their forward position, but when the land-wheel is in its raised position the positions of the arms are reversed. Thus if the land-wheel be in its lowered position and the clutch thrown in, the constantly driven sprocket 48 will give the pinion 50 complete rotation, which will rotate the gear 51 a half rotation, which will carry the arm 53 to its rearward position, shown in Fig. 1, similarly shifting thrust rod 56, arm 37, link 36 and arm 35, raising the land-wheel, and on the next movement of the clutch the pinion will be given a second rotation in the same direction, and the gear 51 a semi-rotation which will reverse the position of the parts.

The clutch 49, by which the sprocket wheel 48 is connected to the pinion 50, is illustrated in Figs. 11 to 13 inclusive, and is substantially like the clutch disclosed in my patent numbered 1,052,740 granted February 11, 1913, and therefore need be only briefly described. It comprises a pair of members, the driving member which consists of a disk 58 being mounted upon or secured to the hub of sprocket 48, and the driven member comprising a disk 59 mounted upon or secured to the hub of the pinion 50. Normally the disk 58 rotates with the sprocket 48 while the disk 59 remains stationary. Means under the control of the operator are provided, however, for locking the disks together. For this purpose the disk 58 has an overhanging flange 60 extending toward the driven disk 59, the interior wall of which is corrugated, or provided with a series of teeth 61, extending completely around the same. Engagement between the two disks whereby they are rotated together is effected by a dog 62 which is pivoted at 63 to the driven disk and formed with an angle or tooth 64 adapted to engage whichever of the teeth 61 are opposite the same at the time the dog is operated. Normally, however, the dog is maintained in inoperative position by a spring 65, compressed between lug 66 on the dog and a similar lug 67 upon the driven disk. Upon the hub 68 of the driven disk is journaled a sleeve 69, carrying an arm 70 which is formed with a stud, or projection 71, which extends through an opening 72 formed in the driven disk, and into a notch 73 in the long arm of the dog 62 in which it has a limited movement. The arm 70 is impelled in the direction of the arrow in Fig. 11, by a spring 74 which is superior to spring 65, so that when said spring 74 is free to act upon the arm, the latter through the stud 71 forces the dog into engagement with the toothed flange 60. When this takes place obviously the driving and driven members of the clutch move together by reason of the fact that the dog is mounted upon the driven member and the teeth upon the driving member. Normally, however, the arm 70 is restrained from moving under the influence of its spring by means of a latch 75 which engages a notch 76 in the end of said arm, the latch 75 is pivoted to a stud 76 upon the casting 30, and is provided with an eye 77 for the attachment of a cord to be pulled by the operator when the relative position of the land-wheel is to be changed. The stud 76 likewise supports a spring-pressed pawl 78 which engages a ratchet 79 formed upon the driven disk 59. The ratchet serves to prevent the backward movement of the disk 59, but leaves the latter free to move forwardly when driven by the driving disk. It will be remembered that the pinion 50 to which the driven member of the clutch is attached drives the pinion 51, and the latter through the shaft 52, crank arm 53 and thrust rod 56, oscillates the arm 37, and the latter through the tension link 36 operates the arm 35 upon the bar 34 to throw the land-wheel from one position to the other. The pinion 50 is half the diameter of pinion 51 so that a complete rotation of the former gives the latter but half a rotation. Therefore, with the proper predetermined relation between the position of the crank 53 and the arm 70 which engages the trip 75, each rotation of the driven clutch member and its attached pinion, and consequent half rotation of the pinion 51 and arm 53, throws the arm 37 from one extreme position to the other, correspondingly oscillating the arm 35 and the land-wheel.

The operation of the clutch is as follows: The driving member thereof 58 is constantly rotated while the driven member 59 is normally stationary, and is held from reverse movement by the pawl 78, but free to move forwardly. When the position of the land-wheel is to be shifted, however, the operator by means of the cord attached to the latch 75 lifts the latter from engagement with the arm 70, so that the latter is free to move under the impulse of its spring 74. This movement shifts the dog 62 into engagement with the toothed flange upon the driving member of the clutch, and the two clutch members thereafter move in unison for a complete revolution, or in other words until the arm 70 is again arrested by the latch 75 which, in the meantime, has been released by the operator. When the arm is arrested, however, the further forward movement of the driven clutch member causes the release of the dog from engagement with the toothed flange of the driving member because of the engagement of the stud 71 on the arm with the notched end of the dog. Thereafter the driven member remains at rest until the latch is again withdrawn by the operator when the driven member again receives a revolution. As heretofore stated, the complete revolution of the driven clutch member, and the attached pinion gives a half revolution of the gear wheel by which the crank 53 and consequently the arm 37 are shifted from one extreme position to the other. Thus through the link 36 and arm 35 the land-wheel is also shifted from one extreme position to the other. In order to assist in the depression of the land-wheel relative to the frame of the plow, a spring 103 is attached at one end, as 104, to the arm 35, and at its other end to a link 105 which is anchored at 106 to a collar 107, secured upon the squared sleeve 27. The spring exerts a constant tension on the arm 35 and tending to move it forward and to depress the land-wheel.

To the other end of the squared sleeve 38 from that to which the arm 37 is fastened, is secured by means of the bolts 80, a cast bracket 81 which, at its lower end, is formed with a rectangular socket 82 for this purpose, and at its upper end has a vertical sleeve 83. Said sleeve receives the post 84, which is reciprocable therethrough, and at its lower end 85 is bent outwardly at an angle to form a journal for the forward furrow wheel 86. The latter is maintained in position thereon by means of a nut 87 and a collar 88, the latter of which is cast with an offset 89, which bears against the vertical portion of the post and is secured thereto by a strap 90. The bore of sleeve 83 and the post 84 are cylindrical so that the latter is free to revolve in the sleeve, but is maintained in position by means which will be later described. On the upper end of the post 84 is revolubly mounted a casting 91 which comprises a socket for the upper end of said post and a rack arc 92, and a hand lever 93 is pivoted to the casting at 94, and provided with a pawl 95 which engages the rack to maintain the hand lever in adjusted position. The post 84 is adjustable vertically through the casting 81 which, as before stated, is secured upon the sleeve 83, and means are provided for shifting the post and thereby the front furrow wheel at the same time and by the same movement by which the land-wheel 31 is adjusted. For this purpose the shaft 38 upon which the arm 37 is mounted, extends completely through the rectangular sleeve 29 in which, as before observed, it is revolubly mounted, and upon its opposite end carries a lever arm 96 which is connected by the link 97, with an offset 98 upon the hand lever 93. with the hand lever 93 in fixed position the movement of the arm 37 by which the land-wheel is shifted is accompanied by the corresponding movement of the forward furrow wheel, the post 84 being raised or lowered as the case may be by the arm 96 and link 97. The elevation of the forward furrow wheel relative to the frame, however, may be adjusted in either position by angularly adjusting the hand lever 93. The adjustment is assisted by the spring 99 which is attached at one end to the rack casting and at the other to the link 97. The second arm 100 is attached to the arm 96 and extends on the opposite side of the shaft 38, the end of said arm 100 being attached to a spring 101, the other end of which is adjustably fastened to a bracket 102 attached to the sleeve 83. This spring assists in the rotation of the shaft 38 when it is shifted for the purpose of lowering the wheels 31, 86, with reference to the frame of the plow.

For the purpose of attaching the plow to a tractor the bracket 83 and the collar 107 are provided with perforated ears 108, 109, to which are pivoted links 110, 111, which at their forward ends are connected to a crossbar 112. The latter is adapted to be connected at the end adjacent the forward furrow wheel by a link 113 with the rear bar 114 of a tractor, and said link is maintained in its angular relation to the crossbar 112 by a diagonal strut 115 which is pivoted thereto at 116, and secured upon the bolt 117 at its other end, adjustment being provided for by the series of holes 118 in the strut and 112ª in the cross bar respectively.

Link 113 is free to swing about the pivot 119 by which it is attached to the rear bar of the tractor, and in order that the forward furrow wheel may follow the movement of the tractor and be controlled in its position thereby, the collar 88 on the journal of the furrow wheel is provided or formed with a forwardly extending arm 120 by which the wheel and its support may be swung about the post 84 as a center. The arm 120 is connected to the rear end of a lever 121 by a link 122, said lever being adjustably pivoted at 123 to the crossbar 112, and adjustably connected at its front end to the rear bar of the tractor by a second link 124, which engages one of a series of holes 125 in the rear bar of the tractor. By suitable designing and adjusting the lever 121, and the engagement of the link 124 with the rear bar of the tractor, the front furrow wheel is swung about the post 84 to properly follow the tractor.

The rear furrow wheel is adjustable independently of the other two wheels of the plow frame. It is mounted upon the beam of the hind-most disk 15, a casting 126 (Fig. 3) being bolted at 127 to the rear end of said beam and formed with perforated ears 128 in which is pivoted a casting 129. The last named casting can be swung in a vertical plane about its pivot and comprises a sleeve 130 in which is journaled one end 131 of a bent cylindrical bar 132, the other end of which is outwardly bent at 133 to form a journal for the rear furrow wheel 134. The furrow wheel, therefore, aside from its rotation about its axis has a substantially horizontal adjustment about the up-turned end 131 of bar 132 as an axis, and also a movement in a vertical plane about the axis of the pivot of the casting 129. The latter movement provides for the vertical adjustment of the rear furrow wheel which is accomplished by means of a hand lever 135, which has a pawl 136 coöperating with a rack-sector 137, mounted upon the casting 126, and said hand lever is connected to the upper end of the casting 129 at 138 by means of the link 139. Normally the rear furrow wheel is held from swinging in a horizontal plane, its movement in one direction being limited by a projection or rib 140 upon the under face of the casting 126, (see Fig. 4) and in the other direction by a dog 141 pivoted at 142 to the casting 129. When, however, the hand lever 135 is swung to the right, (as seen in Fig. 3) to raise the disks from the furrow as preparatory to turning the plow to begin a new furrow, the dog 141 is swung to a position out of the path of movement of the rod 132 by a link 143 connected at 144 to the lower end of the hand lever, and having a lost motion connection with said dog through a perforation 145 through which it extends, a nut 146 on the link 143 being adjusted to engage the dog at proper point in the movement of the handle to withdraw the same, and permit the rod 132 carrying the rear furrow wheel to swing.

It will be observed that in the normal operation of my improved plow the tractor operator requires no assistance. The hand lever 42 by which the elevation of the land-wheel relative to the frame is adjusted, and the hand lever 93 by which the forward furrow wheel is adjusted are both of them located at the front end of the plow, and in their normal adjusted positions extend forwardly so that they may readily be grasped and operated from the seat of the tractor. Furthermore, when the land-wheel and the forward furrow wheel are to be shifted together to raise or lower the plow disks, the operation may also be effected by the tractor operator without leaving his seat, a mere jerk upon the cord 147 controlling the clutch latch being sufficient. It is only when an adjustment of the rear furrow wheel is necessary that the operator need leave his seat or call for assistance.

I claim:

1. In a device of the class described and in combination with the frame and ground working means carried thereby, furrow wheels mounted at the front and rear end respectively of the frame, a casting mounted at the rear end of the frame, a shaft journaled in the casting, an arm on the shaft, a land wheel journaled at the free end of said arm, a clutch mounted on the shaft, gearing connecting one side of the clutch to the land wheel, a second shaft mounted in the casting, gearing connecting the other side of the clutch and the second said shaft, an arm on the latter, a shaft mounted at the front end of the main beam, means connected to said shaft for raising and lowering the front furrow wheel, an arm on said shaft and connections from said arm to the respective arms on the shafts in said casting.

2. In a device of the class described, a frame, a front and a rear furrow wheel mounted on the frame, a transverse shaft journaled upon the frame near the rear end thereof, an arm connected to said shaft and having a journal thereon, a land wheel mounted on said journal, a second arm on said shaft for oscillating the same, a clutch comprising a driving and a driven member loosely mounted on said shaft, a connection from the driving member of the clutch to the land wheel by which the latter drives the former, a stub shaft parallel to said shaft, connections for driving said stub shaft from the driven clutch member, an arm on the stub shaft, a front shaft parallel to said shaft, an arm on the front shaft, connections therefrom for raising and lowering the front furrow wheel, a connection from the arm on the front shaft to the arm on the stub shaft, a connection from the arm on the front shaft to the arm on the said transverse shaft, and means for throwing the clutch into engagement.

3. In an agricultural implement, a diagonally arranged frame 13, a series of ground working elements connected thereto, three parallel shafts connected to the frame comprising a rear shaft, a stub shaft and a front shaft, the rear shaft and stub shaft being offset laterally with reference to the front shaft, the rear shaft having an arm 33 and a journal 32 thereon, a land wheel 31 on the journal, a clutch comprising a driving and a driven member loosely journaled on the rear shaft, chain and sprocket connections from the land wheel to the driving member of the clutch for driving the latter, a gear wheel on the driven clutch member, a gear wheel on the stub shaft meshing therewith, arms on the stub shaft and rear shaft, respectively, an arm on the front shaft, links connecting the arm on the front shaft with the arms on the rear and stub shafts respectively, a rear furrow wheel, a front furrow wheel, and means connected to the front shaft for raising and lowering the front furrow wheel relative to the frame.

4. In an agricultural implement, a front shaft, a rear shaft and a stub shaft, the front shaft being offset laterally with respect to the rear shaft, a diagonally arranged frame beam connecting said shafts ground working elements mounted on said beam, a rear furrow wheel, a front furrow wheel, a vertically sliding post on which the front furrow wheel is mounted, an arm on the front shaft, a connection from the arm to the post for moving the latter vertically, a second arm on the front shaft, arms on the rear and stub shafts respectively, links connecting the arms on the rear and stub shafts with the arm on the front shaft, a second arm 33 on the rear shaft, a land wheel journaled on the last said arm, a clutch comprising a driving and a driven member loosely journaled on the rear shaft, chain and sprocket connections between the driving member of said clutch and the land wheel, a pinion on the driven clutch member, a pinion on the stub shaft meshing with the pinion on the clutch member, and means for shifting the clutch.

5. In a device of the class described, a beam, a front shaft, a rear shaft and a stub shaft arranged in parallel relation, mounted on the beam, the front shaft being offset laterally with respect to the rear and stub shafts, a rear furrow wheel, a front furrow wheel, connections from the front shaft to the front furrow wheel for raising and lowering the same, arms on each of said shafts, a bracket horizontally pivoted on the arm on the front shaft, a connection from said bracket to the arm on the stub shaft, an adjusting lever pivoted to the bracket and extending upwardly therefrom, means for angularly adjusting said lever, a connection from said lever to the arm on the rear shaft, a second arm on the rear shaft, a land wheel journaled on said second arm, a clutch the members of which are loosely journaled on the rear shaft, a chain and sprocket connection between the land wheel and the driving member of the clutch, a gear mounted on the driven member of the clutch, and a gear in mesh therewith on the stub shaft.

6. In a device of the class described, a frame, front and rear furrow wheels thereon, a transverse front shaft on said frame, connections from said shaft for raising and lowering the front furrow wheel, an arm on said shaft, a transverse rear shaft on said frame, an arm on said shaft connected to the arm on the front shaft, an arm on the rear shaft having a journal thereon, a land wheel mounted on the journal, a clutch freely revoluble upon the rear shaft, operating means between one side of said clutch and said land wheel, a shaft driven from the other side of said clutch, an arm thereon and a connection from said arm to the arm on the front shaft, and means for throwing the clutch into and out of operative position.

7. In a device of the class described, a frame, a rear furrow wheel thereon, a front furrow wheel vertically adjustable thereon, a front shaft, connections from said front shaft to the front furrow wheel for raising and lowering the same, an arm on said front shaft, a rear shaft, an arm on the rear shaft connected to the arm on the front shaft, an arm on the rear shaft having a journal thereon, a land wheel revoluble on the journal, a clutch, driving connections between the land wheel and the driving side of the clutch, an arm operatively connected to the driven side of the clutch, and connections from the last said arm to the arm on the front shaft.

8. In a device of the class described, a frame, a rear furrow wheel thereon, a front furrow wheel vertically adjustable thereon, a front shaft, adjustable connections from said front shaft to the front furrow wheel for raising and lowering the same, an arm on said front shaft, a rear shaft, an arm on the rear shaft connected to the arm on the front shaft, an arm on the rear shaft having a journal thereon, a land wheel revoluble on the journal, a clutch, driving connections between the land wheel and the driving side of the clutch, an arm operatively connected to the driven side of the clutch, and connections from the last said arm to the arm on the front shaft.

9. In a device of the class described, a frame, a rear furrow wheel thereon, a front furrow wheel thereon, a vertically adjustable post upon which the front furrow wheel is mounted, a transverse front shaft, an arm on said shaft, a connection between said arm and adjustable post for raising and lowering the latter, a second arm on the front shaft, a rear shaft, an arm on the rear shaft, a connection from the arm on the front shaft and the arm on the rear shaft for oscillating the latter, an arm on the rear shaft having a journal thereon, a land wheel mounted on the journal, a clutch on the rear shaft, driving connections between the land wheel and the driving side of said clutch, a countershaft, gearing between the driven clutch member shaft and countershaft whereby the latter is given a half revolution for every complete revolution of the rear shaft, an arm on the countershaft and a connection from said arm to the arm on the front shaft for oscillating the latter.

10. In a device of the class described, a frame, a rear furrow wheel thereon, a front furrow wheel, a post carrying the front furrow wheel, a sleeve on the frame in which said post is vertically movable, a front transverse shaft having an arm thereon, an adjustable hand lever mounted upon the post, a connection between said arm and said hand lever, a second arm on the front shaft, a land wheel and connections from said land wheel to the arm on the front shaft whereby the latter is oscillated.

11. In a device of the class described, a frame comprising a main beam and a transverse tubular member 27, a sleeve 83 connected to said transverse tubular member, a post 84 vertically reciprocable in said sleeve, an oscillatory shaft 38 journaled in the transverse member and having an arm at each end thereof, a connection from the arm adjacent said post to the latter whereby the post is raised and lowered, a land wheel, rotary means driven from the land wheel, and a connection from the other arm on the transverse shaft 38 to said rotary means whereby said shaft is oscillated.

12. In a machine of the class described, and in combination with the frame and ground working implements carried thereby, a land wheel, a transverse shaft journaled in the frame and having an eccentric bearing on which said land wheel is journaled, a sprocket connected to said land wheel, a sprocket loosely mounted on said transverse shaft, a pinion loosely mounted on said transverse shaft, a clutch between the sprocket and pinion on the transverse shaft, an arm on said transverse shaft, a second transverse shaft, a gear on said second shaft meshing with the pinion on first said shaft and of twice its diameter, an arm on the second said shaft, a thrust rod pivoted at one end to said arm, an oscillatable frame raising arm pivotally mounted on the frame and to which said thrust rod is connected, and a link connecting the last said arm and the arm on the first said transverse shaft.

13. In a device of the class described, a frame, a transverse shaft journaled thereon, an arm on said shaft, a land wheel horizontally journaled on said arm, a forward transverse shaft 38, an arm 37 secured thereto, means operated by the land wheel for oscillating said arm 37 and shaft 38, a connection from arm 37 to first mentioned transverse shaft whereby oscillation of arm 37 causes an oscillation of said transverse shaft to raise and lower said land wheel, a furrow wheel 86, a post 84 on which said furrow wheel is journaled, a vertical sleeve 83 mounted on said frame guiding said post, an arm 96 on shaft 38, and a connection from said arm to said post whereby oscillation of shaft 38 raises and lowers the post.

14. In a device of the class described, a frame, a transverse shaft journaled thereon, an arm on said shaft, a land wheel horizontally journaled on said arm, a forward transverse shaft 38, an arm 37 secured thereto, means operated by the land wheel for oscillating said arm 37 and shaft 38, a connection from arm 37 to first mentioned transverse shaft whereby oscillation of arm 37 causes an oscillation of said transverse shaft to raise and lower said land wheel, a furrow wheel 86, a post 84 on which said furrow wheel is journaled, a vertical sleeve 83 mounted on said frame guiding said post, an arm 96 on shaft 38, a link 97, and a hand lever 93 adjustably pivoted on said post to which said link is connected.

15. In a device of the class described, a frame, ground working implements carried by the frame, a transverse front shaft, a vertically adjustable front furrow wheel, an adjustable connection from said front shaft to the furrow wheel for raising and lowering the same, an upwardly extending arm on the front shaft, a shaft at the rear end of the frame, an arm carried by said shaft, a land wheel journaled on said arm, a sprocket connected to said land wheel, a sprocket on the last said shaft, a chain connecting the sprockets, a pinion on the last mentioned shaft, a clutch for connecting the pinion and sprocket on said shaft, a gear driven by the pinion, an arm on the last mentioned shaft, an arm connected to the gear wheel, a connection from the last mentioned arm to the arm on the front shaft, and an adjustable connection from the arm on the shaft journaled in the rear end of the frame to the arm on the front shaft.

CLEMENT W. MICHAEL.